(12) United States Patent
Spika et al.

(10) Patent No.: US 11,661,061 B2
(45) Date of Patent: May 30, 2023

(54) METHOD AND DEVICE FOR ASSISTING A DRIVER IN A VEHICLE

(71) Applicant: Volkswagen Aktiengesellschaft, Wolfsburg (DE)

(72) Inventors: Marius Spika, Braunschweig (DE); Theodor Heinze, Helmstedt (DE); Jan Sonnenberg, Didderse (DE); Hannes Wendland, Wolfsburg (DE); Roland Penner, Wolfsburg (DE); Jan Bickerdt, Braunschweig (DE); Carsten Semmler, Cremlingen (DE); Julia Drüke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 240 days.

(21) Appl. No.: 15/734,183

(22) PCT Filed: May 15, 2019

(86) PCT No.: PCT/EP2019/062518
§ 371 (c)(1),
(2) Date: Dec. 1, 2020

(87) PCT Pub. No.: WO2019/233719
PCT Pub. Date: Dec. 12, 2019

(65) Prior Publication Data
US 2021/0163009 A1    Jun. 3, 2021

(30) Foreign Application Priority Data
Jun. 8, 2018   (DE) ............ 10 2018 209 183.8

(51) Int. Cl.
*B60W 30/18*      (2012.01)
*B60W 40/072*     (2012.01)
*B60W 40/04*      (2006.01)

(52) U.S. Cl.
CPC ...... *B60W 30/18163* (2013.01); *B60W 40/04* (2013.01); *B60W 40/072* (2013.01); *B60W 2540/225* (2020.02); *B60W 2555/20* (2020.02)

(58) Field of Classification Search
CPC .......... B60W 30/18163; B60W 40/04; B60W 40/072; B60W 2540/225; B60W 2555/20; (Continued)

(56) References Cited

U.S. PATENT DOCUMENTS

| 9,933,781 | B1* | 4/2018 | Bando ............ G05D 1/0246 |
| 2015/0061894 | A1* | 3/2015 | Strassberger ...... G08G 1/163 340/901 |
| 2015/0148985 | A1 | 5/2015 | Jo |
| 2017/0166220 | A1* | 6/2017 | Ando ............ B60W 50/14 |

(Continued)

FOREIGN PATENT DOCUMENTS

| DE | 102004018681 A1 | 11/2005 |
| DE | 102004019337 A1 | 11/2005 |
| DE | 102004029369 B4 | 6/2006 |

(Continued)

OTHER PUBLICATIONS

PCT/EP2019/062518. International Search Report. (dated Sep. 24, 2019).

*Primary Examiner* — Peter D Nolan
*Assistant Examiner* — Ashley L Redhead, Jr.
(74) *Attorney, Agent, or Firm* — Peter Zura; Loza & Loza, LLP

(57) ABSTRACT

Assisting a driver in a vehicle, wherein the vehicle has an environment sensor system for acquiring environment data of an environment surrounding the vehicle and a controller (Continued)

for determining a current traffic status from the acquired environment data. A current overtaking maneuver status is determined, wherein each overtaking maneuver status includes one of a plurality of successive situations during an overtaking maneuver, making available at least one assistance information item on the basis of the determined current traffic status, wherein the assistance information is made available in accordance with the determined current overtaking maneuver status, and outputting the assistance information which is made available.

19 Claims, 11 Drawing Sheets

(58) Field of Classification Search
CPC ..... B60W 2050/146; B60W 2554/802; B60W 2554/804; B60W 2556/10; B60W 2556/50; B60W 50/14; G08G 1/0129; G08G 1/167
See application file for complete search history.

(56) References Cited

U.S. PATENT DOCUMENTS

| | | | | |
|---|---|---|---|---|
| 2017/0235305 | A1* | 8/2017 | Jung | G05D 1/021 701/23 |
| 2018/0141588 | A1* | 5/2018 | Shimizu | B62D 15/0265 |
| 2018/0148061 | A1* | 5/2018 | Reckziegel | B60W 50/14 |
| 2020/0079395 | A1* | 3/2020 | Ibuka | B60W 60/0053 |
| 2020/0164882 | A1* | 5/2020 | Beiderbeck | G08G 1/167 |
| 2020/0216073 | A1* | 7/2020 | Vladimerou | B60W 30/09 |

FOREIGN PATENT DOCUMENTS

| | | |
|---|---|---|
| DE | 102010004625 A1 | 7/2011 |
| DE | 102011086299 A1 | 5/2013 |
| DE | 102013219447 A1 | 3/2015 |
| DE | 102014205391 A1 | 9/2015 |
| DE | 102015221911 A1 | 5/2017 |
| DE | 102015015944 A1 | 6/2017 |
| DE | 102016215565 A1 | 2/2018 |
| DE | 102016220583 A1 | 4/2018 |
| EP | 2353957 B1 | 8/2011 |

* cited by examiner

| | a) | b) | c) | d) |
|---|---|---|---|---|
| | (Info) | Info | ! | !!! |
| | 7-1 | 7-2 | | |
| 20-1 | 7-1 | | | |
| 20-2 | 7-1 | 7-3 | 7-5 | |
| 20-3 | 7-1 | 7-4 | 7-6 | 7-7 |

FIG. 10

METHOD AND DEVICE FOR ASSISTING A DRIVER IN A VEHICLE

RELATED APPLICATIONS

The present application claims priority to International Patent Application No. PCT/EP2019/062518 to Spika et al., filed May 15, 2019, titled "Method and Device for Assisting a Driver in a Vehicle", which claims priority to German Patent Application No. DE 102018209183.8 to Spika et al., filed Jun. 8, 2018, the contents of each being incorporated by reference in their entirety herein.

BACKGROUND

The present disclosure relates to a method and a device for assisting a driver in a vehicle, in particular a motor vehicle.

Modern vehicles have numerous assistance systems that assist the driver of the vehicle in driving the vehicle. This assistance provides information regarding the environment of the vehicle, and/or information regarding other road users, for example.

For example, during a passing maneuver, important information is needed that assists the driver when executing a passing maneuver. This assistance information includes information regarding oncoming vehicles, preceding vehicles, and regarding the quality of an upcoming section of the route. Currently, the assistance information provided during a passing maneuver is inadequate.

SUMMARY

Aspects of the present disclosure are directed to technologies and techniques for assisting a driver in a vehicle in which assistance information for the driver during a passing maneuver can be provided more effectively.

In some examples, technologies and techniques are disclosed for assisting a driver in a vehicle in which the vehicle includes an environment sensor system for obtaining environment data in a vehicle environment, and a control unit for determining the current traffic conditions from the environment data. Statuses may be determined for a current passing maneuver wherein these passing maneuver statuses each represent one of numerous successive situations during a passing maneuver. Assistance information may be provided on the basis of the current traffic conditions that have been determined, wherein the assistance information is provided on the basis of the current passing situation, and outputting this assistance information.

In some examples, a device is disclosed for a vehicle for assisting a driver is created which includes an environment sensor system for collecting environment data in a vehicle's environment, and a control unit for determining current traffic conditions from the environment data that has been collected, wherein the control unit is configured to execute the following steps: determining current passing maneuver statuses, wherein these passing maneuver statuses each represent one of numerous successive situations during a passing maneuver, providing at least some assistance information on the basis of the current traffic conditions that have been determined, wherein the assistance information is provided on the basis of the current passing situation, and outputting this assistance information.

An advantage of the present disclosure is that the assistance information can be output adequately to the driver, both with regard to the content as well as to the urgency. By distinguishing between the various passing maneuver statuses, it is possible to provide assistance information suited to every situation. In this manner, it is possible to avoid overwhelming the driver with information. As a result, the driver therefore receives the assistance information that is necessary in each situation during the passing maneuver.

The environment sensor system may be configured as a three-dimensional sensor system, which can include, for example, a front camera, a top view camera, a lidar sensor, radar sensor, and/or an ultrasonic sensor.

A current traffic condition may be determined from the environment data and include information regarding objects in the environment, for example, in the form of the respective objects (passenger cars, trucks, bicycles, pedestrians, etc.) and the respective position and/or speed and/or acceleration within the environment. The current traffic conditions may also include information regarding the criticality of the respective object within the environment of the vehicle, wherein this criticality represents a measure for the extent that the respective object must be monitored for safety reasons, e.g., in order to ensure that sufficient distance to the object is maintained, and/or to prevent a collision with the object. Oncoming and preceding vehicles can be detected in the environment data, and marked as such accordingly in the current traffic conditions.

The current traffic conditions can also be determined in some examples while taking information regarding the route into account.

BRIEF DESCRIPTION OF THE DRAWINGS

The invention shall be explained below in greater detail based on preferred exemplary embodiments with reference to the figures. Therein:

FIG. 10 shows a schematic overview of the output assistance information according to some aspects of the present disclosure;

DETAILED DESCRIPTION

Figure 1:
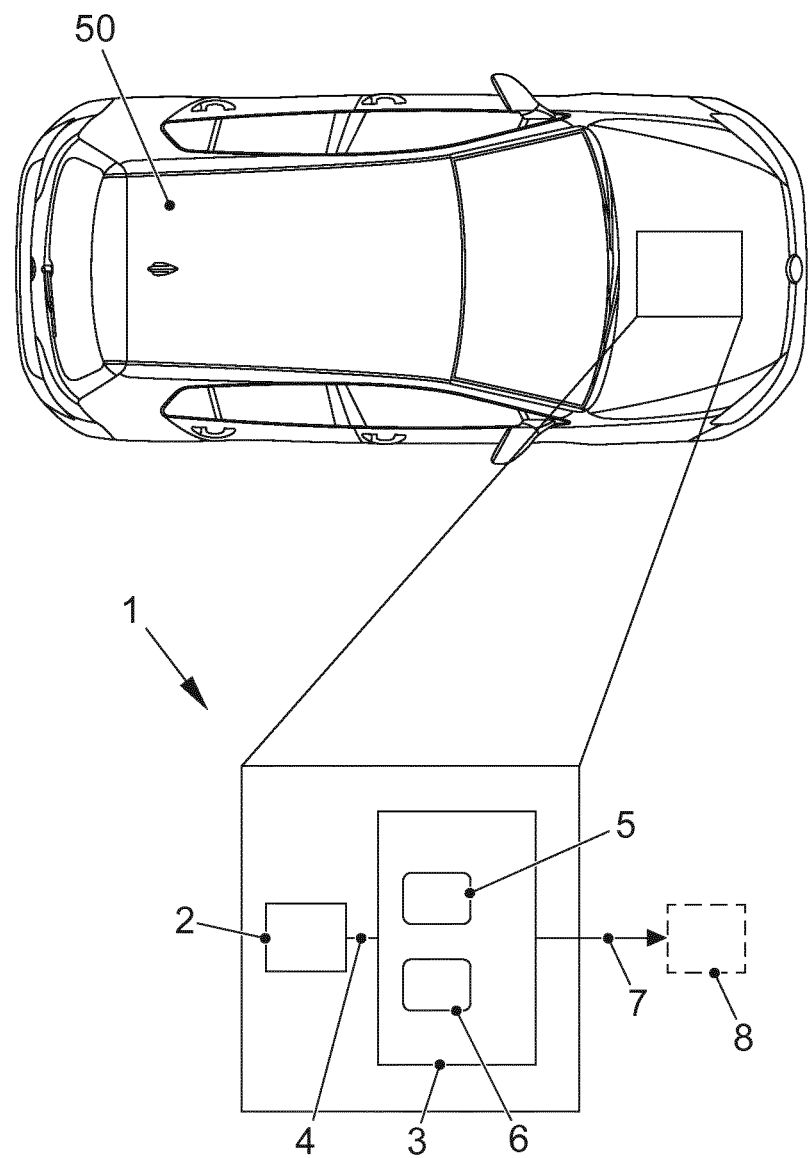
FIG. 1 shows a schematic illustration of an embodiment of the device for assisting a driver in a vehicle according to some aspects of the present disclosure.

In order to determine passing maneuver statuses, numerous input parameters may be processed. By way of example, environment data collected by the environment sensor system can be evaluated. It is also possible to use other sensors that detect a current state of the vehicle, the environment, and/or the driver. For example, the current traffic conditions can be taken into account when determining passing maneuver statuses. Other sources of information can also be taken into account when determining passing maneuver statuses. Numerous sensors and/or information sources can also be evaluated collectively, or the resulting data can be combined to determine or establish passing maneuver statuses. Pattern recognition, statistical and/or estimation processes can also be used.

Passing maneuver statuses are determined when prerequisites for the passing maneuver are satisfied by the input parameter(s). These criteria include, for example, a predetermined state of the vehicle and/or a predetermined state of the environment, and/or a predetermined state of the driver of the vehicle.

The assistance information can be output visually, acoustically, and/or haptically. By way of example, the assistance information can be output on a display device configured for this, e.g. via a multimedia device in the vehicle, and/or a head-up display. LED strips in the vehicle can also output the assistance information, or a portion thereof. It is likewise possible to output the assistance information via a loudspeaker, e.g. in the form of an announcement. The assistance information can also be output haptically, e.g. in the form of a vibration in the steering wheel or seat in the vehicle.

In one embodiment it is possible to distinguish between at least the following passing maneuver statuses, and it can be determined that:
 a) the vehicle is approaching a preceding vehicle or following this vehicle,
 b) there is a desire to pass,
 c) a passing maneuver is to be carried out immediately, or has already begun, or
 d) the vehicle has veered off.

The passing maneuver status a) can be determined, e.g. when the distance to a preceding vehicle is less than 50 meters. If the driver remains behind the preceding vehicle, this condition remains in effect.

Passing maneuver status b) can be determined, e.g. when the driver intends to pass, but has not yet determined when.

Passing maneuver status c) can be determined, e.g. when the passing maneuver is to be carried out immediately, i.e. the driver has already started the passing maneuver, e.g. by accelerating.

Passing maneuver status d) can be determined, e.g. when the vehicle leaves a lane in which it has been traveling and changes or has changed to an adjacent lane.

There can also be different passing maneuver statuses, or different categories thereof. In particular, a passing maneuver can include fewer or more passing maneuver statuses, or classified therein.

In some examples, the difference in the speeds of the one vehicle and the preceding vehicle can be determined and evaluated. The speed of the one vehicle can be determined using the speedometer in the vehicle. The speed of the preceding vehicle can be determined by means of a sensor designed for this purpose. The difference in speeds can be determined and evaluated by the control unit, wherein the control unit is configured accordingly for this. By way of example, passing maneuver status b) can be determined in this manner, if the difference in speed to the preceding vehicle exceeds a predetermined threshold value.

In some examples, a map of the environment is taken into account and assessed when determining the passing maneuver status. Characteristics of the current and upcoming environment of the vehicle can be taken into account in this manner. The environment map can be stored, e.g. in a memory provided for this in the control unit. The environment map can also be provided by an external facility, e.g. an external server. This can take place, e.g. via a communication interface configured for this in the control unit or the device.

In some examples, a status probability can be determined and taken into account when determining the passing maneuver statuses. This makes it possible, for example, to take various input variables and characteristics, e.g. the current environment or current vehicle parameters, into account, and potentially weigh them. Based on this status probability, one of the passing maneuver statuses can be determined, e.g. when a status probability for this passing maneuver status lies above a predetermined threshold value. The status probability can be determined, e.g. by the control unit, which is configured for this accordingly.

In some examples, passing priority zones may be stored in the environment map. Passing priority zones include places and/or areas in which passing occurs frequently. These places can be sections of a route that have multiple lanes and good visibility, and which remain straight for a longer distance, such that a driver can always see and assess the current traffic conditions during a passing maneuver, and there is enough space to pass.

In some examples, the environment map may be created with the passing priority zones on the basis of driving data recorded previously with the vehicle and/or other vehicles. Recorded odometry data for the vehicle and recorded position, speed and acceleration data can be collected and evaluated for this, for example. It is then possible to identify the locations and areas where passing frequently takes place with this data. These places and areas are subsequently marked in the environment map as passing priority zones.

In some examples, the status probability may be determined, taking the passing priority zones stored in the environment map into account. It can therefore be assessed via the stored locations and areas, whether or not the driver can then execute a passing maneuver.

In some examples, the status probability for the passing maneuver status b) and/or passing maneuver status c) increases when the vehicle is at a predefined distance to a passing priority zone. If the vehicle is at the location or in the region of a passing priority zone, or close thereto, the probability increases that a passing maneuver will be carried out soon. Accordingly, it is also assumed that the status probability for the passing maneuver statuses b) and c) is then higher when determining the passing maneuver status.

In some examples, traffic nodes are also stored in the environment map, wherein a status probability is determined taking the traffic nodes into account. Traffic nodes are places in the route network at which roadways cross, e.g. intersections, exit and entry ramps, etc.

In some examples, a status probability for the passing maneuver status b) and/or the passing maneuver status c) decreases when there is at least one traffic node in the immediately upcoming environment. According to the present disclosure, the tendency of a driver to pass decreases in the vicinity of a traffic node. This is then taken into account when determining the status probability.

In some examples, collected and/or current driving data are taken into account when determining the passing maneuver status, wherein these collected and/or current driving data are compared with known driving patterns that anticipate a passing maneuver. By way of example, the status probability of a passing maneuver status may increase if the collected and/or current driving data correspond to a driving pattern that typically anticipates a passing maneuver. A status probability of a passing maneuver status can also decrease if the collected and/or current driving data do not reflect these driving patterns at the start of the passing maneuver.

The comparison of the recorded driving data with known driving patterns makes it possible to detect or anticipate an intention on the part of the driver. The recorded driving data can be stored, e.g. in a memory in the control unit. The recorded driving data can also be provided by an external facility, e.g. a server. This information can be communicated by means of a communication interface in the control unit or the device, e.g. via an internet connection. The comparison can be carried out subsequently in the control unit, which is configured accordingly for this.

In some examples, a driver's state detected by a driver sensor system may be taken into account when determining the passing maneuver status. In this manner, characteristics and/or behavioral patterns of the driver can be taken into account when determining the passing maneuver status. Known movement patterns of the driver that are regularly carried out prior to initiating a passing maneuver can be used to determine a passing maneuver status, e.g. passing maneuver statuses b) or c). An intention on the part of the driver can also be detected or anticipated via the detection of the driver's state, which improves the determination of the passing maneuver status.

The device accordingly includes a driver sensor system and the control unit is configured to process and assess the detected driver's state in accordance with the steps of the methods disclosed herein.

In some examples, the driver's state detected by means of the driver sensor system includes at least one head position of the driver and/or an angle of rotation for the driver's head, and/or the direction that the driver's eyes are looking. If, for example, the angle of rotation of a driver's head and/or the direction the driver is looking are detected on a two lane road that indicate that the driver is looking for approaching vehicles in the parallel lane (glancing over his shoulder), it can then be determined that the passing maneuver statuses b) or c) are currently in effect.

In some examples, a topographic environment map with topographical information regarding the route are assessed and taken into account when determining the passing probability and/or when providing the at least some assistance information. The topographic environment map can be stored, e.g. in a memory in the control unit, or it can be provided by an external server via a communication interface in the control unit.

The environment map can include the topographic environment map, or the topographic information contained therein.

In some examples, visibility information can be stored in the topographic environment map, and/or visibility information can be assessed on the basis of the topographic environment map, wherein the visibility information indicates the current or future quality of visibility for the driver of the vehicle in a respective upcoming section of the route for each position in the topographic environment map.

The control unit can assess the visibility information on the basis of the topographical information and/or a route selection, in that the control unit is configured for this.

In some examples, at least some visibility information is or will be assessed taking the radii of curves in an upcoming section of the route into account.

In some examples, at least some visibility information is or will be assessed taking changes in elevation into account. These changes in elevation are taken from the topographic environment map. Depending on the perspective, there are different levels of visibility, dictated by the changes in elevation, because these changes have limiting effects on visibility.

In some examples, at least some visibility information is or will be assessed taking buildings and/or trees into account. Buildings and/or trees may also limit the field of view. Taking this into account improves assessments regarding visibility. These buildings and/or trees are likewise stored in the topographic map, or derived therefrom.

In some examples, at least some visibility information is or will be assessed taking current local light conditions and/or weather conditions into account. This allows for the current weather conditions to be taken into account when assessing visibility. In particular, the light conditions and/or weather conditions can be taken into account in real time. The associated information can be obtained, e.g. through an external server for a weather service. This can take place, e.g. via a communication interface in the control unit, wherein the control unit, or the device, respectively, is configured for this. This associated information can also be obtained by means of the vehicle sensor system.

In some examples, at least some visibility information is or will be assessed taking a detected driver's state into account. In this manner it is possible to draw a conclusion regarding the field of view or visibility necessary to detect an object by determining the direction the driver is looking, or determining a change in the direction the driver is looking, and/or a reaction on the part of the driver when the specific object has been noticed. If a driver first starts to brake, for example, when a tractor has been detected ahead of the vehicle, just before reaching the tractor, it can then be derived from the reaction that the field of view or visibility was insufficient at this location or in this situation to react to this tractor early enough.

The driver's state may be detected by a driver sensor system. The data from the driver's sensor system are evaluated and processed by the control unit, for example, wherein the control unit is configured accordingly for this.

In some examples, at least some visibility information is or will be assessed taking the collected environment data into account. Patterns in the collected environment data can be assessed for this. By way of example, a preceding vehicle can be detected by means of a front camera. The preceding vehicle is tracked in the collected environment data by means of pattern recognition methods, and the distance thereto is estimated. A field of view, or the visibility is then assessed on the basis of this object tracking in the environment data. The control unit can make the assessment, wherein the control unit is configured accordingly for this.

In some examples, at least some visibility information is taken into account when determining the status probability. The determination of the passing maneuver status can be further improved in this manner. If the driver only has limited visibility, e.g. at a certain location along the route, the probability of the passing maneuver statuses b) and c) is very low, because presumably the driver would not initiate a passing maneuver at this location. Accordingly, the status probabilities for the passing maneuver statuses b) and c) (and potentially d)) are lower.

In some examples, a driver profile is taken into account when determining the passing maneuver status. A driver profile includes, e.g. data from previous passing maneuvers by the driver. The driver profile can be stored, e.g. in a memory in the control unit, or it can be provided to the control unit by an external server via a communication interface.

In some examples, the driver profile is compared with the current traffic conditions and the results of the comparison are taken into account when determining the status probability for the passing maneuver status. If there are patterns, e.g. in the current traffic conditions and/or current vehicle data that are the same as patterns in previous passing maneuvers, the probability that the driver is planning and/or will initiate a passing maneuver increase. For example, a status probability for passing maneuver statuses b) and c) can be increased in this case. The comparison can be carried out, e.g. by the control unit, wherein the control unit is configured accordingly for this.

In some examples, characteristics of the vehicle are taken into account when determining the passing maneuver statuses. Characteristics of the vehicle may include, e.g. the current load state of the vehicle and/or the current condition of the tires on the vehicle. In this manner, the characteristics of the vehicle can be taken into account when determining the passing maneuver statuses and/or when providing the assistance information. It is therefore possible to anticipate the capacity of a vehicle to react to driver inputs (e.g. steering, acceleration, deceleration, etc.) from the current condition of the tires and/or from the current load condition, and to provide assistance information accordingly. The characteristics of the vehicle can be queried, e.g. via the onboard electronics system and/or by the driver of the vehicle via a corresponding query or input template, e.g. on a display operating device in the vehicle.

In some examples, the determination of the current traffic conditions and/or the determination of the passing maneuver status can also take place taking at least some traffic information into account. Traffic information includes, e.g. information regarding construction sites along an upcoming route. The status probability of a passing maneuver status may also be reduced here, e.g. when a construction site can be expected in an upcoming section of the route, such that the probability that the driver will pass here is reduced.

The traffic information can be queried, e.g. via an automobile radio (e.g. the Traffic Message Channel, TMC), and/or an external server for a traffic information service (e.g. Real Time Traffic Information, RTTI). Furthermore, driving data from other vehicles can be assessed and current traffic information can be derived from the results. The traffic information can be sent to the control unit or the device via a corresponding communication interface.

In some examples, assistance information is output after the passing maneuver status a) has been determined, which includes the characteristics of an upcoming route section that are relevant for a potential passing procedure. These relevant characteristics may be, e.g. the condition of the road, the number of lanes, information regarding a no passing zone (start and/or end thereof), or other limiting traffic information and/or a change in speed limits. In this passing maneuver status a), the assistance information is to be output in a decent manner, e.g. merely as information on a head-up display with lower priority and/or urgency.

In some examples, assistance information is output after the passing maneuver status b) has been determined, which assists the driver in preparing for a passing maneuver. In particular, this assistance information includes information enabling the driver to execute a passing maneuver safely, i.e. avoiding risky situations. This assistance information can also include the information that is provided and output after determining passing maneuver status a). This assistance information can also include information indicating that a desire to pass has been determined.

In some examples, the assistance information also includes a passing distance necessary for the passing maneuver. In particular, the speed of the vehicle, possible and typical accelerations of the vehicle in passing maneuvers, the speed of a preceding vehicle, the distance to a preceding vehicle, and the length of the preceding vehicle are taken into account here.

In some examples, the assistance information includes information regarding oncoming vehicles. This information can be derived by the control unit from the collected environment data, for example. By way of example, the assistance information can include the distance to and speed of an oncoming vehicle.

In some examples, the assistance information also includes a current and/or anticipated future behavior of an oncoming vehicle. By way of example, it is possible to assess whether the oncoming vehicle will decelerate or accelerate. The assistance information then includes the results of this assessment.

In some examples, the assistance information includes a passing recommendation. The passing recommendation can be of both a positive or a negative nature. By way of example, the passing recommendation can include information regarding an optimal time or an optimal speed for the passing maneuver. The passing recommendation can also include dissuasions for passing maneuvers, e.g. because they may require excessive acceleration or a longer passing distance, etc.

In some examples, after determining the passing maneuver status b) and falling below a predefined distance to a preceding vehicle, the assistance information is provided and output on the basis of at least three conditions:

Passing Condition 1:
If twice the passing distance plus a safety buffer are assessed as having good visibility for the driver, and no oncoming vehicle is detected within the environment, no assistance information is provided or output.

Passing Condition 2:
If twice the passing distance plus a safety buffer are assessed as not having good visibility and no oncoming vehicle is detected in the environment, the assistance information that is provided and output includes at least the information that the route section having good visibility is inadequate for passing safely. Optionally, with assisted driving, the assistance system can also intervene, such that the driver is prevented from changing lanes.

Passing Condition 3:
If an oncoming vehicle is detected in the environment, which would probably collide with the vehicle during a passing maneuver, the assistance information includes at least information regarding the oncoming vehicle.

In some examples, after determining the passing maneuver status c), the assistance information is provided and output on the basis of at least three conditions:

Passing Condition 1:
If twice the passing distance plus a safety buffer are assessed as having good visibility for the driver, and no oncoming vehicle is detected in the environment, no assistance information is provided or output.

Passing Condition 2:

If twice the passing distance plus a safety buffer are assessed as not having good visibility and no oncoming vehicle is detected in the environment, the assistance information that is provided and output includes at least the warning information that the route section having good visibility is inadequate for passing safely, as well as a passing maneuver recommendation that the passing maneuver should not be initiated. Optionally, with assisted driving, the assistance system can also intervene, such that the driver is prevented from changing lanes.

Passing Condition 3:

If an oncoming vehicle is detected in the environment, which would probably collide with the vehicle during a passing maneuver, the assistance information includes at least the warning information that the passing maneuver should not be initiated.

In some examples, after determining the passing maneuver status d) and if an oncoming vehicle is detected in the environment, the assistance information includes acute warning information regarding the oncoming vehicle and a passing maneuver recommendation that the passing maneuver should be aborted.

Assistance information comprising recommendations and/or warnings can also include information in particular regarding the reasons for the respective recommendation or warning. Such information includes, e.g. a justification in the form of one of the following:
  oncoming traffic,
  inadequate visibility (due to a curve, a hilltop, a dip, weather conditions, etc.),
  upcoming change in the speed limit,
  upcoming change in the speed limit in the region of an upcoming curve,
  upcoming no passing zone,
  inadequate passing distance (e.g. prior to a traffic light, a left turn lane, a traffic island, etc.), or
  other hazards (e.g. game crossing, potholes, accident site, construction site, etc.).

An associated device may be configured to execute the individual and combined embodiments of the method.

A schematic illustration of an embodiment of the device 1 for assisting a driver in a vehicle 50 is shown in FIG. 1. The device 1 is placed in the vehicle 50 and includes an environment sensor system 2 and a control unit 3. The environment sensor system 2 detects an environment of the vehicle 50 and sends the acquired environment data 4 to the control unit 3.

The control unit 3 determines the current traffic conditions 5 from the acquired environment data 4. The current traffic conditions 5 include information regarding preceding and oncoming vehicles as well as the condition of an upcoming road. The control unit 3 is also configured to determine a current passing maneuver status 6. For this, the control unit 3 can determine the difference in speeds between the vehicle 50 and a preceding vehicle by means of the environment sensor system 2, and compare this difference with a threshold value. Furthermore, odometry and/or position or navigation data can be evaluated by the control unit 3, in order to determine the passing maneuver status 6.

The control unit 3 subsequently provides at least some assistance information 7 on the basis of the determined current traffic conditions 5, wherein the provision of the assistance information 5 takes place on the basis of the determined current passing maneuver status 6.

This assistance information 7 is subsequently output, e.g. on a display device 8.

Figure 2:
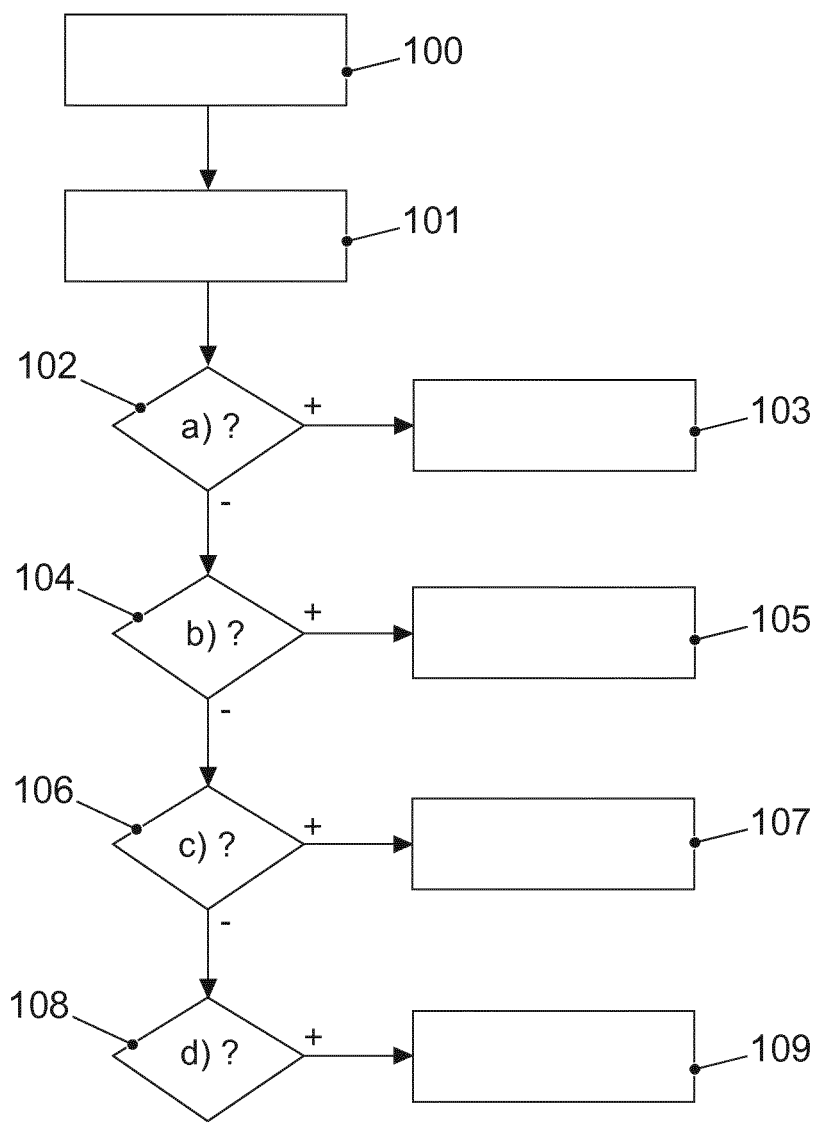
FIG. 2 shows a schematic flow chart for an embodiment of the method for assisting a driver in a vehicle according to some aspects of the present disclosure.

A schematic flow chart of an embodiment of the method for assisting a driver in a vehicle is shown in FIG. 2. At least one of the following passing maneuver statuses is distinguished, and it can be determined by the control unit:
  a) the vehicle is approaching a preceding vehicle or following this vehicle,
  b) there is a desire to pass,
  c) a passing maneuver is to be carried out immediately, or has already begun, or
  d) the vehicle 50 has veered off.

The passing maneuver status a) can be determined, e.g. when a distance to a preceding vehicle is less than 50 m (or more than another predetermined value). If the driver remains behind the preceding vehicle, the passing maneuver status a) remains in effect.

Passing maneuver status b) can be determined, e.g. if the driver has the intention to pass, but the timing has not yet been determined.

Passing maneuver status c) can be determined, e.g. if the passing maneuver is to take place in the immediate future, i.e. the driver has already initiated the first measures for passing, e.g. by starting to accelerate.

Passing maneuver status d) can be determined, e.g. if the vehicle changes lanes, or is about to change to an adjacent lane.

In a first step 100, environment data for the vehicle's environment are collected by means of an environment sensor system. The environment data include information in particular regarding preceding and oncoming vehicles.

In a subsequent step 101, a current passing maneuver status is determined by the control unit. The determined current passing maneuver status is subsequently checked in steps 102, 104, 106, 108 to see if one of the aforementioned passing maneuver statuses a) to d) are currently in effect.

Information adapted to the associated passing maneuver status is output in each of the steps 103, 105, 107, 109, wherein the corresponding step 103, 105, 107, 109 is carried out if the check has established that the respective passing maneuver status is in effect. Depending on the current traffic situation, the assistance information is then provided with different contents and/or scope and/or intensity and output on the basis of the determined passing maneuver status.

Figure 3:
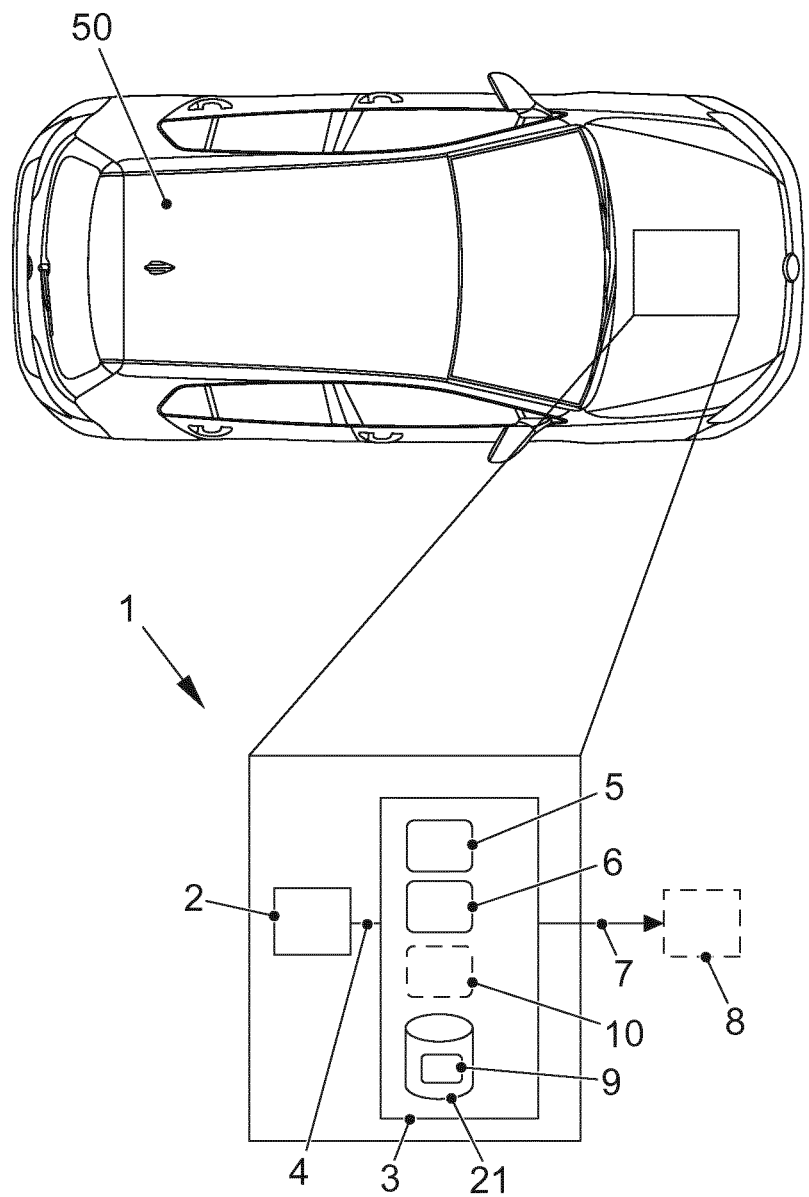
FIG. 3 shows a schematic illustration of another embodiment of the device for assisting a driver in a vehicle according to some aspects of the present disclosure.

A schematic illustration of another embodiment of the device 1 for assisting a driver in a vehicle 50 is shown in FIG. 3. The device 1 is placed in the vehicle 50, and includes an environment sensor system 2 and a control unit 3. The environment sensor system 2 detects the environment of the vehicle 50 and sends the collected environment data 4 to the control unit 3.

The control unit 3 determines current traffic conditions 5 on the basis of the collected environment data 4. The current traffic conditions 5 include, e.g., information regarding preceding and oncoming vehicles as well as the condition of an upcoming road. The control unit 3 is also configured to determine a current passing maneuver status 6. The control unit 3 can determine, e.g., a difference in speeds between the vehicle 50 and a preceding vehicle by means of the environment sensor system 2, and compare this with a threshold value. Moreover, odometry and/or position or navigation data can be assessed by the control unit 3 to determine the passing maneuver status 6.

The control unit 3 also includes a memory 21. An environment map 9 is stored in the memory 21. The environment map 9 in particular is taken into account and assessed when the control unit 3 determines the passing maneuver status 6. Characteristics of the current and upcoming environment of the vehicle 50 are stored in the environment map 9, which can be taken into account in this manner. Alternatively, the environment map 9 can be provided by an external facility, e.g. an external server. This can take place, e.g. via a communication interface (not shown) in the control unit 3 or the device 1 configured for this.

The control unit 3 can also determine and take into account a status probability 10 when determining the passing maneuver status 6. This makes it possible to take various input variables and various characteristics into account, e.g. the current environment or current vehicle parameter, and to weigh these accordingly when determining the passing maneuver status 6. A passing maneuver status 6 can subsequently be determined on the basis of the determined status probability 10, e.g. if a determined status probability 10 lies above a predetermined threshold value.

Passing priority zones may also be stored in the environment map 9. Passing priority zones are places and/or areas in the environment map 9 where passing takes place particularly frequently. These places are, e.g. route sections with multiple lanes and good visibility, and which are straight for longer sections, such that the driver can always see and assess the current traffic conditions 5 during the passing maneuver, and a passing distance is long enough.

The environment map 9 can also be created with the passing priority zones on the basis of driving data recorded previously with the vehicle 50 and/or other vehicles. Odometry data for the vehicle as well as recorded position, speed and/or acceleration data can be collected and evaluated. It is then possible to identify the locations and areas where passing frequently takes place with this data. These places and areas are subsequently marked in the environment map as passing priority zones.

The status probability 10 can also be determined taking the passing priority zones stored in the environment map 9 into account. It can then be assessed via the stored places and areas whether or not the driver can execute a passing maneuver at this point.

A status probability 10 for a passing maneuver status b) and/or a passing maneuver status c) can also be increased in the exemplary embodiment in FIG. 2 if the vehicle 50 is at a predefined distance to a passing priority zone. If the vehicle 50 is at the location or in the area of a passing priority zone, or close thereto, the probability that the passing maneuver will be carried out in the immediate future is increased. Accordingly, it is also assumed that the passing maneuver statuses b) and c) are in effect when determining the passing maneuver status 6, because passing here is more probable than at other locations.

Traffic nodes can also be stored in the environment map 9, such that a status probability 10 can be determined taking these traffic nodes into account. As a result, places where roads cross, e.g. intersections, entry and exit ramps, etc. can also be taken into account.

For example, the status probability 10 for the passing maneuver status b) and/or the passing maneuver status c) is reduced when there is at least one traffic node in the immediate, upcoming environment. The tendency of a driver to execute a passing maneuver normally decreases near a traffic node. This is taken into account accordingly when determining the status probability 10.

The control unit 3 subsequently provides at least some assistance information 7 on the basis of the determined current traffic conditions 5, wherein this assistance information 5 is provided on the basis of the determined current passing maneuver status 6.

The assistance information 7 that is provided may be subsequently output, e.g. on a display device 8.

Figure 4:
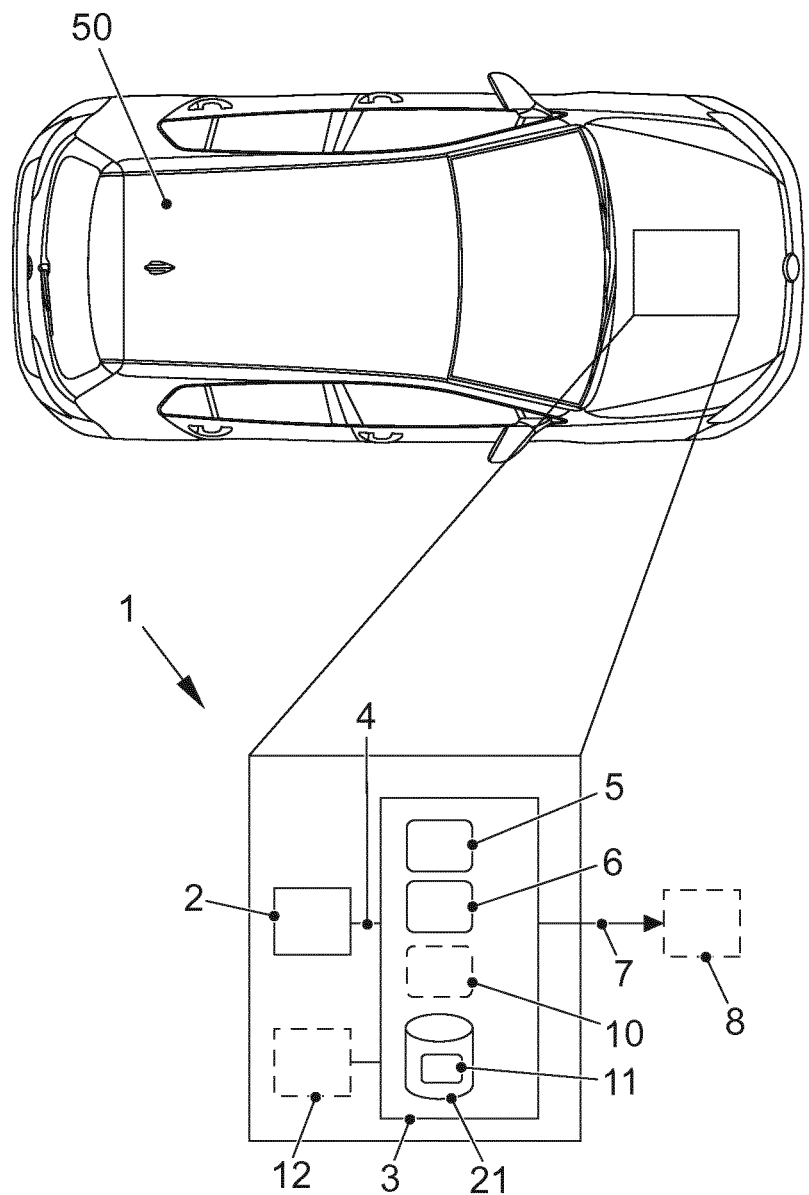
FIG. 4 shows a schematic illustration of another embodiment of the device for assisting a driver in a vehicle according to some aspects of the present disclosure.

Another embodiment of the device 1 is shown in FIG. 4, which is a further development of the embodiment shown in FIG. 1. In this embodiment, the control unit 3 takes recorded driving data 11 into account when determining the passing maneuver status 6, wherein the recorded driving data are compared with known driving patterns that anticipate a passing maneuver.

By way of example, a status probability 10 can also be increased if the recorded driving data 11 correspond to a driving pattern that anticipates a passing maneuver. A status probability 10 for a passing maneuver status 6 can also be reduced if the recorded driving data 11 are not the same as the corresponding driving patterns at the start of the passing maneuver. The comparison of the recorded driving data 11 with known driving patterns makes it possible to detect or assess an intention on the part of the driver of the vehicle 50. The recorded driving data 11 can be stored, e.g. in a memory 21 in the control unit 3.

The recorded driving data 11 can also be provided by an external facility, e.g. a server. This can take place via a communication interface 12 in the control unit 3, e.g. via an internet connection.

Figure 5:
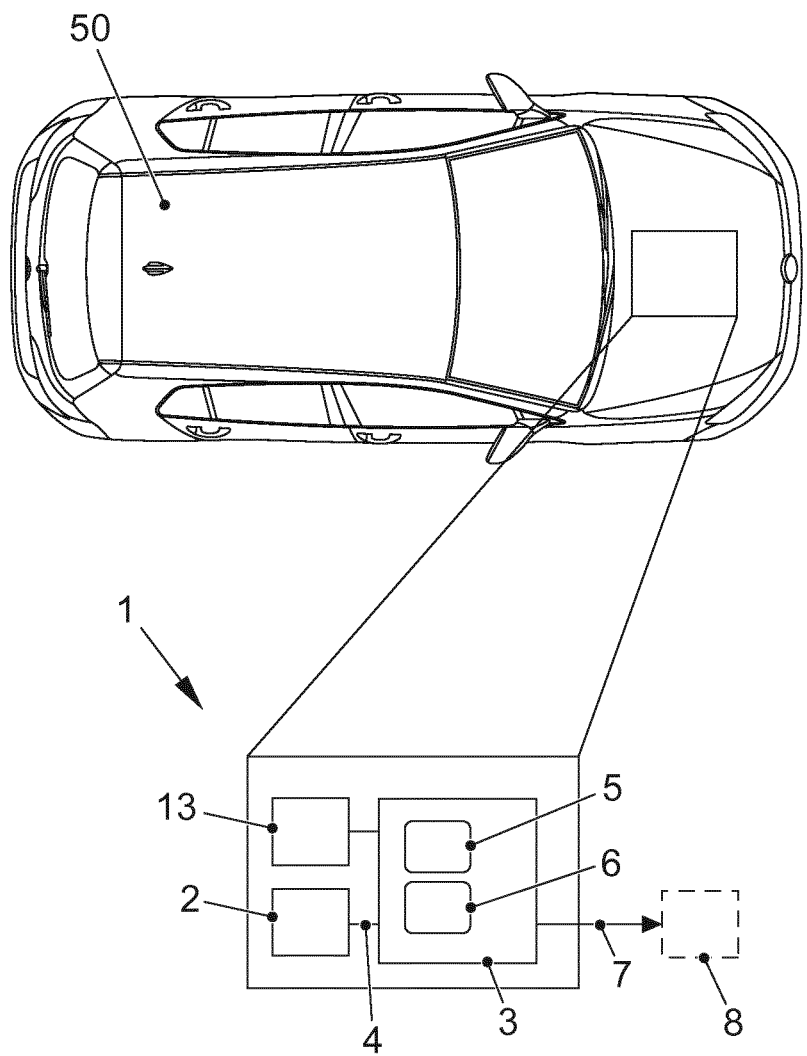
FIG. 5 shows a schematic illustration of another embodiment of the device for assisting a driver in a vehicle according to some aspects of the present disclosure.

Another embodiment of the device 1 is shown in FIG. 5, which is a further development of the embodiment shown in FIG. 1. In this embodiment, the device 1 includes a driver sensor system 13. The control unit 3 also takes the driver's state detected by the driver sensor system 13 into account in determining the passing maneuver status 6. In this manner, the control unit 3 can also take characteristics and/or behaviors of the driver into account when determining the passing maneuver status 6. By way of example, known movement patterns of the driver that are regularly carried out by the driver prior to initiating a passing maneuver can be used to determine a passing maneuver status 6, e.g. passing maneuver statuses b) or c) (see FIG. 2). By detecting the driver's state, an intention of the driver of the vehicle 50 can be identified or anticipated, by means of which the determination of the passing maneuver status 6 can be further improved.

The driver's state detected by means of the driver sensor system 13 can also include at least a driver's head position and/or the angle of rotation of the driver's head, and/or the direction in which the driver's eyes are looking. If a head rotation angle and/or direction in which the driver's eyes are looking is detected on a two-lane road that indicate the driver is checking the parallel lane for approaching vehicles (looking over the shoulder), it can be determined that the passing maneuver status b) or c) are currently in effect.

Figure 6:
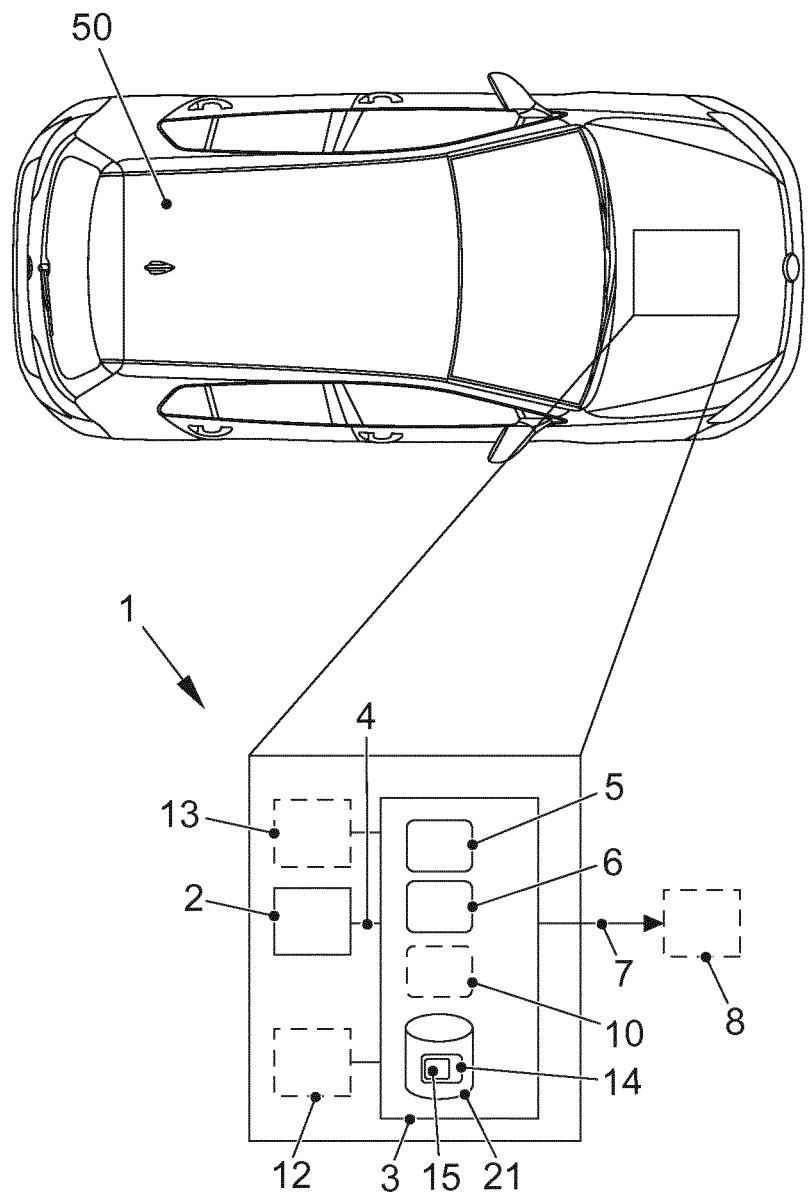
FIG. 6 shows a schematic illustration of another embodiment of the device for assisting a driver in a vehicle according to some aspects of the present disclosure.

Another embodiment is shown in FIG. 6, which is a further development of the embodiment shown in FIG. 1. The control unit 3 evaluates and takes into account a topographic environment map 14 containing topographical information regarding the route when determining the passing maneuver status 6 and/or when providing the at least some assistance information 7. The topographic environment map 15 can be stored in a memory 21 in the control unit 3, or it can also be provided to the control unit 3 by an external server via a communication interface 12.

Visibility information 15 can also be stored in the topographic environment map 14, and/or visibility information 15 can be assessed on the basis of the topographic environment map 14, wherein the visibility information 15 for each position in the topographic environment map 14 indicates the visibility for the driver of the vehicle 50 for each upcoming section of the route.

The assessment of the visibility information 15 can be carried out, e.g. by the control unit 3 on the basis of the topographical information stored in the topographic environment map 14 and/or a route selection.

It may also be the case that at least some visibility information 15 is or will be assessed taking curve radii in an upcoming section of the route into account.

It may also be the case that at least some visibility information 15 is or will be assessed taking changes in elevation into account. These changes in elevation are derived from the topographic environment map 14. Depending on the perspective, there are different levels of visibility, dictated by the changes in elevation, because these changes have limiting effects on visibility.

It may also be the case that at least some visibility information 15 can be assessed taking buildings and/or trees into account. Buildings and/or trees may also limit the field of view. Taking this into account improves assessments regarding visibility. These buildings and/or trees are likewise stored in the topographic map 14, or derived therefrom.

It may also be the case that at least some visibility information 15 is or will be assessed taking current local light conditions and/or weather conditions into account. This allows for the current weather conditions to be taken into account when assessing visibility. In particular, the light conditions and/or weather conditions can be taken into account in real time. The associated information can be obtained, e.g. through an external server for a weather service. This can take place, e.g. via a communication interface 12 in the control unit 3. This associated information can also be obtained by means of the vehicle sensor system.

It may also be the case that at least some visibility information 15 is or will be assessed taking a detected driver's state into account. The device 1 includes a driver sensor system 13 for detecting the driver's state. The data provided by the driver sensor system 13 are evaluated and processed by the control unit 3, for example. In this manner, it is possible to draw a conclusion regarding the field of view or visibility necessary to detect an object by determining the direction the driver is looking, or determining a change in the direction the driver is looking, and/or a reaction on the part of the driver when the specific object has been noticed. If a driver first starts to brake, for example, when a tractor has been detected ahead of the vehicle, just before reaching the tractor, it can then be derived from the reaction that the field of view or visibility was insufficient at this location or in this situation to react to the tractor early enough.

It may also be the case that at least some visibility information 15 is or will be assessed taking the collected environment data 4 into account. Patterns in the collected environment data 4 can be assessed by the control unit 3 for this. By way of example, a preceding vehicle can be detected by means of a front camera. The preceding vehicle is tracked in the collected environment data 4 by means of pattern recognition methods, and the distance thereto is estimated. A field of view, or the visibility is then assessed by the control unit 3 on the basis of this object tracking in the environment data 4.

It may also be the case that a status probability 10 is determined by the control unit 3. The control unit 3 can take at least some visibility information 15 into account when determining the status probability 10. In this manner, the determination of the passing maneuver status 6 can be further improved.

If the driver only has limited visibility at a specific location on the route, for example, the probability that the passing maneuver status b) or c) (see FIG. 2) is in effect is very low, because the driver presumably would not initiate a passing maneuver at this location.

Figure 7:
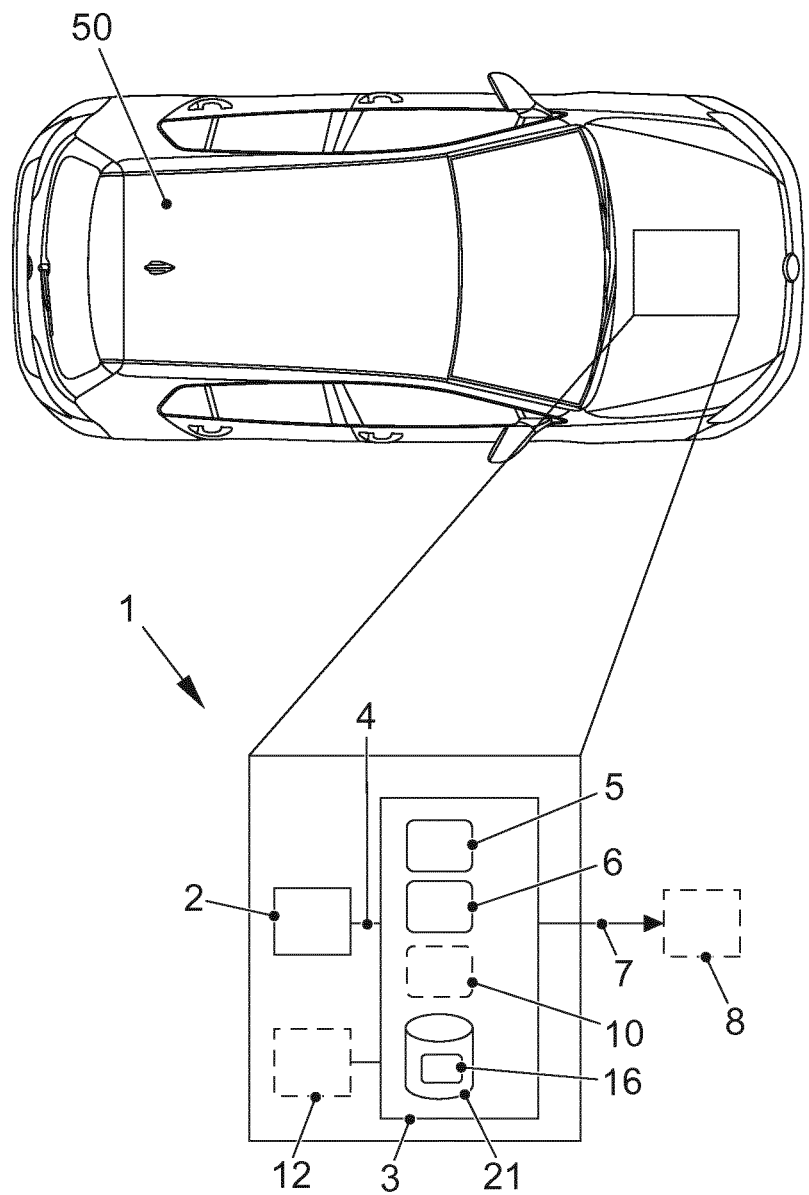
FIG. 7 shows a schematic illustration of another embodiment of the device for assisting a driver in a vehicle according to some aspects of the present disclosure.

Another embodiment of the device 1 is shown in FIG. 7, which is a further development of the embodiment shown in FIG. 1. In this case, the control unit 3 takes a driver profile 16 into account when determining the passing maneuver status 6. A driver profile 16 includes, e.g. data from previous passing maneuvers by the driver. The driver profile 16 can be stored, e.g. in a memory 21 in the control unit 3, or it can be provided by an external server via a communication interface 12.

It may be the case that a status probability 10 for the passing maneuver status 6 is determined by the control unit 3. The driver profile 16 is compared with the current traffic conditions 5 by the control unit 3, and the results of the comparison are taken into account when determining the status probability 10 for the passing maneuver status 6. If there are patterns, e.g. in the current traffic conditions 5 and/or current vehicle data that are the same as patterns in previous passing maneuvers in the driver profile 16, the probability that the driver is planning and/or will initiate a passing maneuver increases.

In particular, a status probability for passing maneuver statuses b) and c) can be increased in this case (see FIG. 2).

Figure 8:
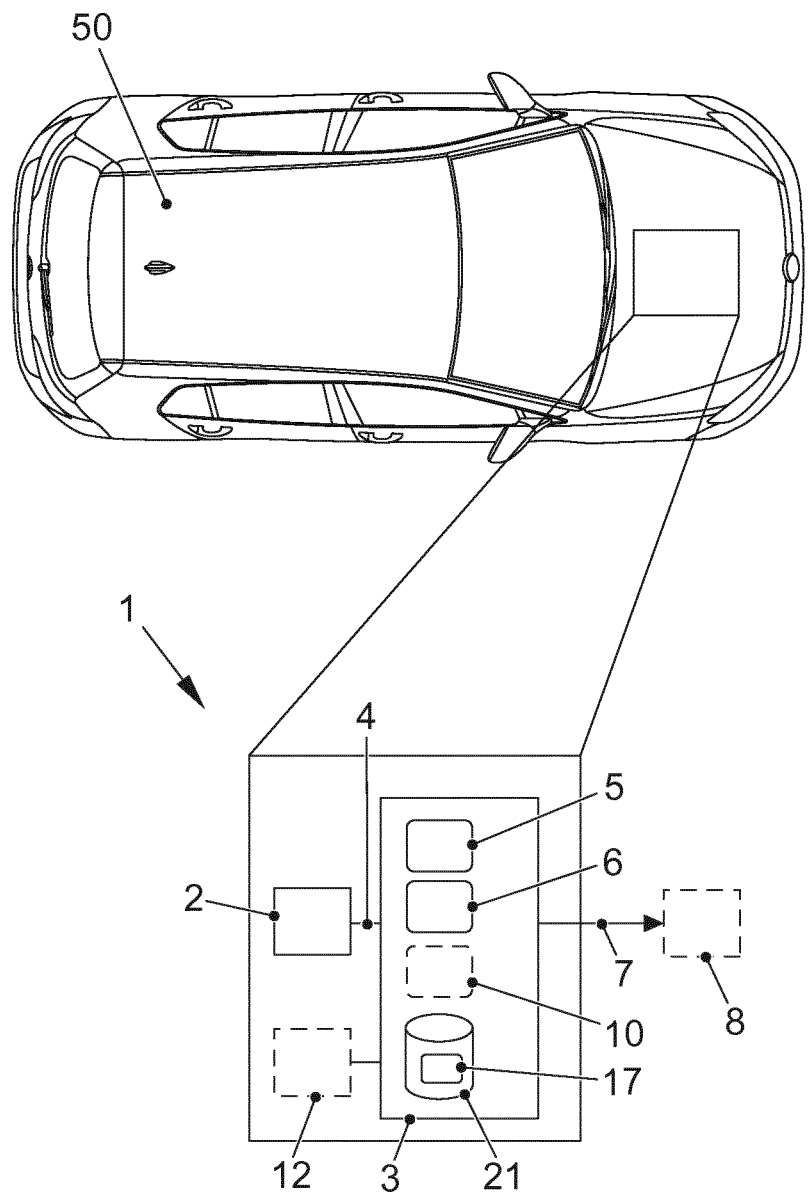
FIG. 8 shows a schematic illustration of another embodiment of the device for assisting a driver in a vehicle according to some aspects of the present disclosure.

Another embodiment of the device 1 is shown in FIG. 8, which is a further development of the embodiment shown in FIG. 1. In this embodiment, the control unit 3 takes characteristics 17 of the vehicle 50 into account when determining the passing maneuver status 6.

Characteristics 17 of the vehicle 50 may include, e.g. the current load state of the vehicle 50 and/or the current condition of the tires on the vehicle 50. These characteristics 17 can be temporarily stored in a memory 21 in the control unit 3. In this manner, the characteristics 17 of the vehicle 50 can be taken into account when determining the passing maneuver statuses 6 and/or when providing the assistance information 7. It is therefore possible to anticipate the capacity of a vehicle 50 to react to driver inputs (e.g. steering, acceleration, deceleration, etc.) from the current condition of the tires and/or from the current load state, and to provide assistance information 7 accordingly.

The characteristics 17 of the vehicle 50 can be queried, e.g. via the onboard electronics system and/or by the driver of the vehicle 50 via a corresponding query or input template, e.g. on a display operating device in the vehicle 50. The device 1 includes a corresponding interface 12 for this, in order to communicate with the onboard electronics or the display and operating device in the vehicle 50.

The control unit 3 can also estimate a status probability 10 for the passing maneuver status 6 with this embodiment, while taking the characteristics 17 of the vehicle 50 into account.

Figure 9:
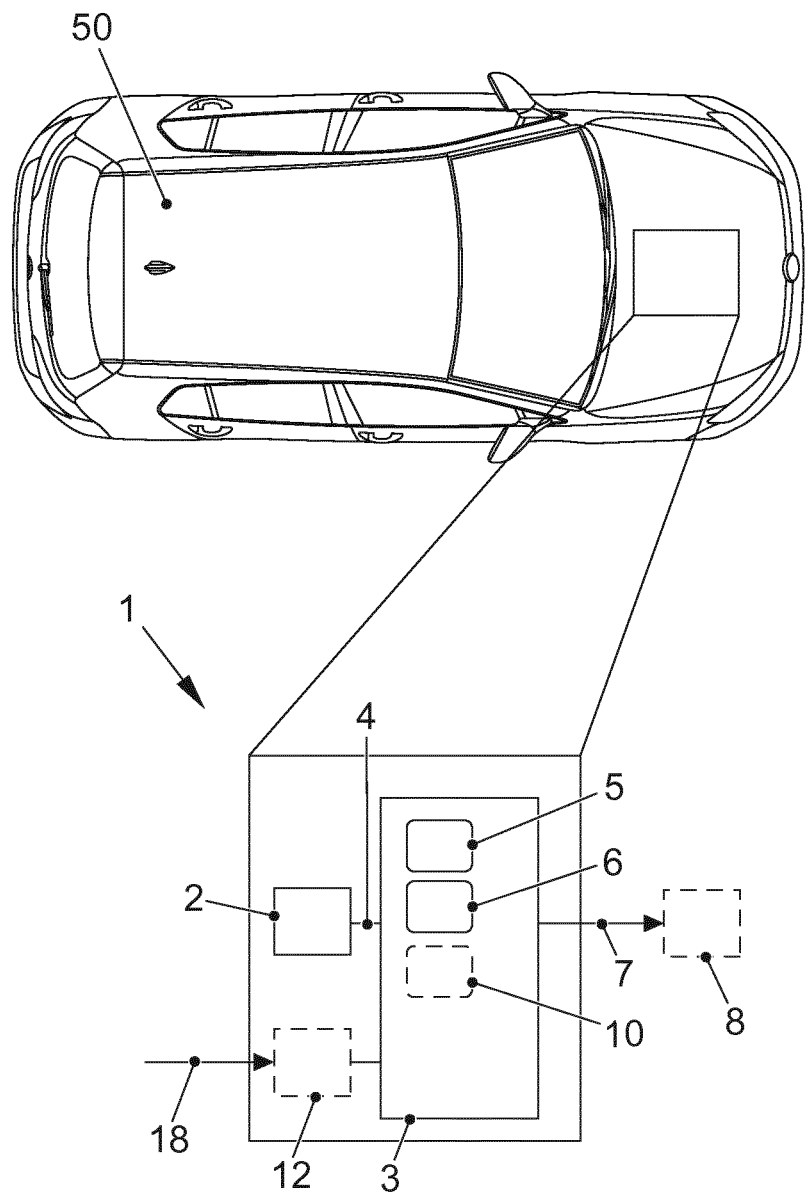
FIG. 9 shows a schematic illustration of another embodiment of the device for assisting a driver in a vehicle according to some aspects of the present disclosure.

Another embodiment is shown in FIG. 9, which is based on the embodiment in FIG. 1. In this case, the determination of the current traffic conditions 5 and/or the determination of the passing maneuver status 6 also take place taking at least some traffic information 18 into account. Traffic information 18 includes, e.g. information regarding construction along an upcoming section of the route.

A status probability 10 for the passing maneuver status 6 can also be determined by the control unit 3 in which the status probability 10 is modified by the control unit 3 on the basis of the traffic information 18. In particular, the status probability 10 can be reduced by the control unit 3, e.g. if a construction site can be expected in the upcoming route section, such that the probability that the driver will pass is reduced.

The traffic information 18 can be queried, e.g. via an automobile radio (e.g. the Traffic Message Channel, TMC) and/or an external server for a traffic information service (e.g. Real Time Traffic Information, RTTI). Traffic information 18 can be queried, e.g. via a corresponding communication interface 12 in the device 1.

Driving data from other vehicles can also be evaluated, and current traffic information 18 can be derived therefrom. This driving data can likewise be provided, e.g. via a communication interface 12 in the device 1.

The embodiments shown in FIGS. 2 to 9 can be combined in various manners with one another, depending on the application.

And embodiment of the method for providing and outputting at least some assistance information 7 on the basis of the determined current traffic conditions is shown in FIG. 10 in an overview table. According to the present disclosure, the assistance information 7 is provided on the basis of the determined current passing maneuver status 6. At this point, a distinction is made between the passing maneuver statuses 6 defined in conjunction with the exemplary embodiment shown in FIG. 2. The type 19 of assistance information 7 that is provided is shown in the second line in the table, wherein a distinction is made between early information ("(info)"), information ("info"), early warning ("!") and acute warning ("!ü").

The assistance information 7 that is provided is shown on the basis of the respective passing conditions 20-1, 20-2, 20-3. The current traffic conditions 5 corresponding to the respective passing conditions 20-1, 20-2, 20-3 are shown schematically in FIGS. 11a, 11b, and 11c. In each case, a vehicle 50 is trailing a preceding vehicle 51. A passing distance 52, visibility 53, or the distance 54 to an oncoming vehicle 55 are also shown.

Figure 11A:
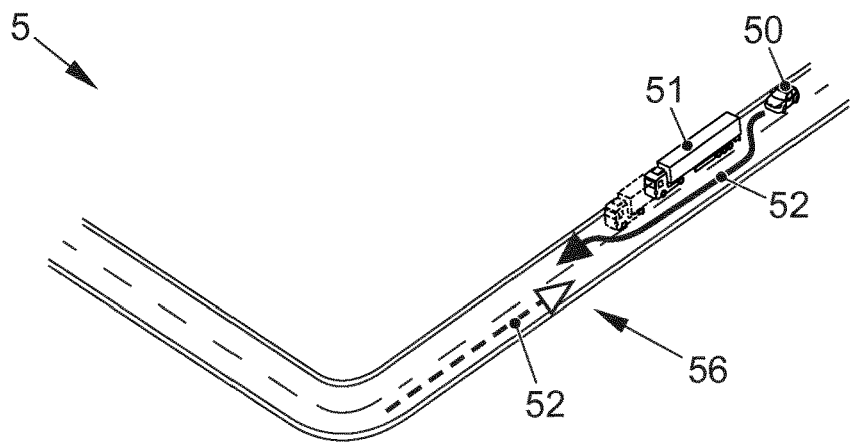
FIGS. 11*a*-11*c* show schematic illustrations of the different passing conditions in FIG. 10 according to some aspects of the present disclosure.
Figure 11B:
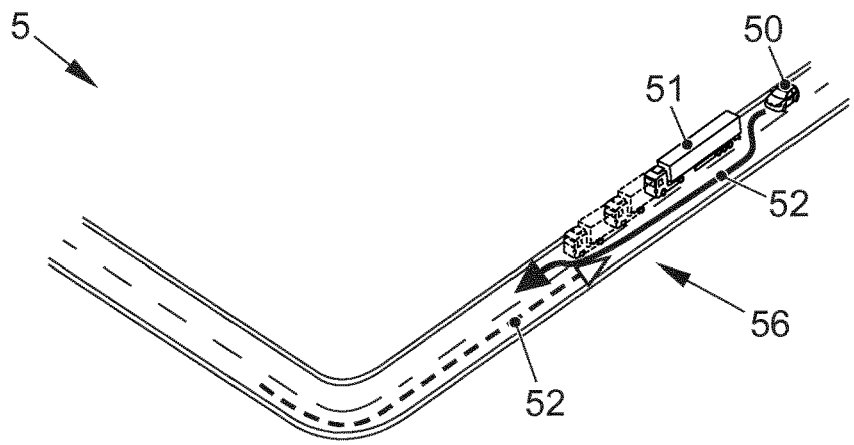
Figure 11C:
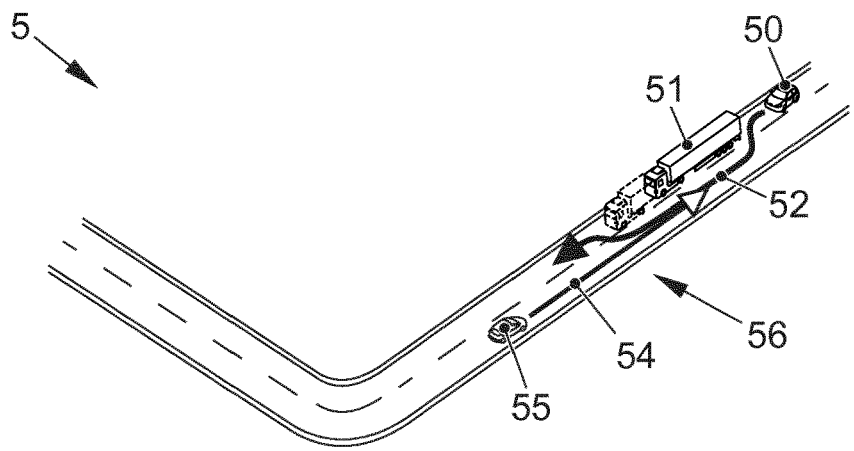

After determining the passing maneuver status 6 "a)," assistance information 7-1 is output, which includes characteristics of an upcoming route section 56 that are relevant for a potential passing procedure (FIGS. 11a, 11b, 11c). The relevant characteristics are, e.g. the road condition, the number of lanes in the road, information regarding no passing zones (start and/or end), or other limiting traffic guidelines and/or a change in the speed limit. The assistance information 7-1 provided in this passing maneuver status 6 "a)" is to be output in a perceptible manner, e.g. merely as an announcement on a head-up display, with low priority and/or urgency. A distinction is not made between passing conditions 20-1, 20-2, 20-3 in this specific passing maneuver status 6 "a)."

After determining the passing maneuver status 6 "b)," assistance information 7-2 is output, which assists the driver in preparing for the passing maneuver. In particular, this assistance information 7-2 includes information that enables the driver to carry out a safe passing maneuver, i.e., avoiding risky situations. The assistance information 7-2 can also include information provided in the framework of the assistance information 7-1 that was provided and output after determining the passing maneuver status 6 "a)." This assistance information 7-2 can also include information indicating that a desire to pass has been determined.

In particular, after determining the passing maneuver status 6 "b)," and coming to within a predetermined distance to a preceding vehicle, the assistance information is provided and output on the basis of at least three passing conditions 20-1, 20-2, 20-3:

Passing Condition 1:
If twice the passing distance 52 plus a safety buffer are assessed as having good visibility for the driver, and no oncoming vehicle 55 is detected in the environment, no assistance information 7 is provided or output.

Passing Condition 2:
If twice the passing distance 52 plus a safety buffer are assessed as not having good visibility and no oncoming vehicle 55 is detected in the environment, the assistance information 7-3 that is provided and output includes at least the warning information that the route section 56 having good visibility is inadequate for passing safely.

Passing Condition 3:
If an oncoming vehicle 55 is detected in the environment, which would probably collide with the vehicle 50 during a passing maneuver, the assistance information 7-4 includes at least information regarding the oncoming vehicle 55.

Furthermore, after determining the passing maneuver status 6 "c)," the assistance information 7 is provided and output on the basis of the same three passing conditions 20-1, 20-2, 20-3:

Passing Condition 1:
If twice the passing distance 52 plus a safety buffer are assessed as having good visibility for the driver, and no oncoming vehicle 55 is detected in the environment, no assistance information 7 is provided or output.

Passing Condition 2:
If twice the passing distance 52 plus a safety buffer are assessed as not having good visibility and no oncoming vehicle 55 is detected in the environment, the assistance information 7-5 that is provided and output includes at least the warning information that the route section 56 having good visibility is inadequate for passing safely, as well as a passing maneuver recommendation that the passing maneuver should not be initiated. Optionally, with assisted driving, the assistance system can also intervene, such that the driver is prevented from changing lanes.

Passing Condition 3:
If an oncoming vehicle 55 is detected in the environment, which would probably collide with the vehicle 50 during a passing maneuver, the assistance information 7-6 includes at least warning information regarding the oncoming vehicle 55, and a passing maneuver recommendation that the passing maneuver should not be initiated. Optionally, with assisted driving, the assistance system can also intervene, such that the driver is prevented from changing lanes.

Assistance information comprising recommendations and/or warnings can also include information regarding the reasons for the respective recommendations or warnings. This information includes, e.g. justification in the form of one of the following:
oncoming traffic,
inadequate visibility (due to a curve, a hilltop, a dip, weather conditions, etc.),
upcoming change in the speed limit,
upcoming change in the speed limit in the region of the upcoming curve,
upcoming no passing zone,
inadequate passing distance (e.g., prior to a traffic light, a left turn lane, a traffic island, etc.), or other hazards (e.g., game crossing, potholes, accident site, construction site, etc.).

Furthermore, after determining the passing maneuver status 6 "d)," and if an oncoming vehicle 55 has been detected in the environment (passing condition 20-3), the assistance information 7-7 includes acute warning information regarding the oncoming vehicle 55, and a passing maneuver recommendation that the passing maneuver should be aborted.

LIST OF REFERENCE SYMBOLS 1 device
2 environment sensor system
3 control unit
4 environment data
5 current traffic conditions
6 passing maneuver status
7 assistance information
7-1 assistance information
7-2 assistance information
7-3 assistance information
7-4 assistance information
7-5 assistance information
7-6 assistance information
7-7 assistance information
8 display device
9 environment map
10 status probability
11 recorded driving data
12 communication interface
13 driver sensor system
14 environment map
15 visibility information
16 driver profile
17 characteristics of the vehicle
18 traffic information
19 type of assistance information
20-1 passing condition
20-2 passing condition
20-3 passing condition
21 memory
50 vehicle
51 preceding vehicle
52 twice the passing distance
53 visibility
54 distance
55 oncoming vehicle
100-109 method steps

The invention claimed is:

1. A method for assisting a passing maneuver for a vehicle, comprising an environment sensor system for collecting environment data from an environment of the vehicle and a control unit for determining current traffic conditions from the collected environment data, comprising:
   determining, via the control unit, a current passing maneuver status from a plurality of maneuver statuses comprising at least one of
      a) the vehicle is within a configured distance from a preceding vehicle,
      b) there is a desire to pass,
      c) a passing maneuver is to be carried out immediately, or has already begun, or
      d) the vehicle has veered off;
   evaluating a topographic environment map comprising topographic information regarding a route selection when determining the passing maneuver status;
   assessing visibility information on the basis of the topographic environment map, wherein the visibility information indicates the visibility level in a respective upcoming route section for the driver of the vehicle for each location in the topographic environment map;
   providing assistance information via one or more of visual, acoustic, and/or haptic indicia, via the control unit, on the basis of the determined current traffic conditions, wherein the assistance information is provided on the basis of the determined current passing maneuver status; and
   outputting the provided assistance information from the control unit to the vehicle.

2. The method according to claim 1, further comprising determining and processing a speed difference between the vehicle and the preceding vehicle when determining the passing maneuver status.

3. The method according to claim 1, further comprising processing an environment map comprising passing priority zones generated from recorded driving data when determining the passing maneuver status.

4. The method according to claim 3, wherein the environmental map comprises traffic nodes, and wherein the status probability is determined by processing the traffic nodes.

5. The method according to claim 1, further comprising determining a status probability when determining the passing maneuver status.

6. The method according to claim 5, wherein determining the status probability comprises processing visibility information.

7. The method according to claim 5, wherein the status probability for the passing maneuver status b) and/or the passing maneuver status c) is increased if the vehicle is within a predefined distance to a passing priority zone.

8. The method according to claim 1, further comprising at least one of
   comparing recorded and/or current driving data with store driving patterns that anticipate a passing maneuver when determining the passing maneuver status; and/or
   determining a driver's state via a driver sensor system when determining the passing maneuver status, wherein the driver's state comprises at least one of a head position of the driver, an angle of rotation of the head of the driver, and/or the direction in which the driver's eyes are looking.

9. The method according to claim 1, wherein the visibility information is assessed using a curve radii in an upcoming route section.

10. The method according to claim 1, wherein visibility information is assessed utilizing at least one of (i) changes in elevation, (ii) buildings, (iii) trees, (iv) current light conditions, (v) weather conditions, (vi) detected vehicle condition, and/or (vii) collected environment data.

11. The method according to claim 1, wherein determining the passing maneuver status comprises comparing a driver profile with current traffic conditions, and further comprising determining a status probability for the passing maneuver status based on the comparison.

12. The method according to claim 1, wherein determining the passing maneuver status comprises processing a characteristic of the vehicle.

13. The method according to claim 1, wherein determining at least one of the current traffic conditions and/or the passing maneuver status comprises processing traffic information.

14. The method according to claim 1, wherein the outputted assistance information comprises characteristics of an upcoming route section that are associated with a potential passing maneuver.

15. The method according to claim 1, wherein the outputted assistance information comprise data for assisting the driver in preparing for a passing maneuver.

16. A device for assisting a passing maneuver for a vehicle, comprising:
   an environment sensor system for collecting environment data from an environment of the vehicle; and
   a control unit for determining current traffic conditions from the collected environment data, wherein the control unit is configured to
      determine a current passing maneuver status from a plurality of maneuver statuses comprising at least one of
         a) the vehicle is within a configured distance from a preceding vehicle,
         b) there is a desire to pass,
         c) a passing maneuver is to be carried out immediately, or has already begun, or
         d) the vehicle has veered off;
      evaluate a topographic environment map comprising topographic information regarding a route selection when determining the passing maneuver status;
      assess visibility information on the basis of the topographic environment map, wherein the visibility information indicates the visibility level in a respective upcoming route section for the driver of the vehicle for each location in the topographic environment map;
      provide assistance information via one or more of visual, acoustic, and/or haptic indicia on the basis of the determined current traffic conditions, wherein the assistance information is provided on the basis of the determined current passing maneuver status; and
      output the provided assistance information to the vehicle.

17. The device according to claim 16, wherein the control unit is configured to determine and process a speed difference between the vehicle and the preceding vehicle when determining the passing maneuver status.

18. The device according to claim 17, wherein the control unit is configured to process an environment map comprising passing priority zones generated from recorded driving data when determining the passing maneuver status.

19. A method for assisting a passing maneuver for a vehicle, comprising an environment sensor system for collecting environment data from an environment of the vehicle and a control unit for determining current traffic conditions from the collected environment data, comprising:
   determining, via the control unit, a current passing maneuver status from a probability of a plurality of maneuver statuses comprising at least one of
      a) the vehicle is within a configured distance from a preceding vehicle,
      b) there is a desire to pass,
      c) a passing maneuver is to be carried out immediately, or has already begun, or
      d) the vehicle has veered off;
   evaluating a topographic environment map comprising topographic information regarding a route selection when determining the passing maneuver status;
   assessing visibility information on the basis of the topographic environment map, wherein the visibility information indicates the visibility level in a respective upcoming route section for the driver of the vehicle for each location in the topographic environment map;
   providing assistance information via one or more of visual, acoustic, and/or haptic indicia, via the control unit, on the basis of the determined current traffic conditions, wherein the assistance information is provided on the basis of the determined current passing maneuver status probability; and
   outputting the provided assistance information from the control unit to the vehicle.

* * * * *